(12) United States Patent
Nakao et al.

(10) Patent No.: US 8,223,387 B2
(45) Date of Patent: Jul. 17, 2012

(54) IMAGE DATA PROCESSOR AND IMAGE DATA PROCESSING PROGRAM STORAGE MEDIUM

(75) Inventors: Mitsuru Nakao, Kanagawa (JP); Nobuyuki Shitara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 536 days.

(21) Appl. No.: 12/541,511

(22) Filed: Aug. 14, 2009

(65) Prior Publication Data

US 2010/0060936 A1 Mar. 11, 2010

(30) Foreign Application Priority Data

Sep. 11, 2008 (JP) .................................. 2008-233340

(51) Int. Cl.
*G06K 15/00* (2006.01)

(52) U.S. Cl. ...................... 358/1.18; 358/1.13; 358/1.15; 358/540; 715/200

(58) Field of Classification Search ................. 358/1.13, 358/1.15, 1.18, 540; 715/200, 221, 222, 715/223, 224, 225, 235

See application file for complete search history.

(56) References Cited

U.S. PATENT DOCUMENTS

| | | | | |
|---|---|---|---|---|
| 6,441,919 B1* | 8/2002 | Parker et al. | ................. | 358/1.18 |
| 6,952,801 B2* | 10/2005 | Warmus et al. | ................. | 715/251 |
| 7,375,842 B2* | 5/2008 | Kloosterman et al. | ........ | 358/1.18 |
| 2005/0162676 A1* | 7/2005 | Aoki | ............................ | 358/1.13 |

FOREIGN PATENT DOCUMENTS

JP        2005-210395       8/2005

* cited by examiner

*Primary Examiner* — King Poon
*Assistant Examiner* — Allen H Nguyen
(74) *Attorney, Agent, or Firm* — Young & Thompson

(57) ABSTRACT

Based on layout information, in regard to a group of reusable objects appearing in a range from a lowermost layer to a layer immediately before a variable object appears in the order of arranging image objects, one new reusable object is generated for each group of pages on which reusable objects constituting the group of reusable objects are identical and have same arrangement positions, the new reusable object generated by merging the reusable objects constituting the group of reusable objects. Also new layout information is generated by replacing description of each of the reusable objects constituting the group of reusable objects in the layout information with description of the new reusable object corresponding to the group of reusable objects.

8 Claims, 13 Drawing Sheets

FIG. 2

| OBJECT ID | X-POSITION | Y-POSITION | REUSABLE |
|---|---|---|---|
| FIRST-PAGE LAYOUT | | | |
| 3 | X03 | Y03 | ○ |
| 2 | X02 | Y02 | ○ |
| 1 | X01 | Y01 | ○ |
| 8 | X08 | Y08 | × |
| SECOND-PAGE LAYOUT | | | |
| 4 | X04 | Y04 | ○ |
| 5 | X05 | Y05 | ○ |
| 9 | X09 | Y09 | × |
| 10 | X10 | Y10 | × |
| 6 | X06 | Y06 | ○ |
| 7 | X07 | Y07 | ○ |

| OBJECT ID | X-POSITION | Y-POSITION | REUSABLE |
|---|---|---|---|
| THIRD-PAGE LAYOUT | | | |
| 3 | X03 | Y03 | ○ |
| 2 | X02 | Y02 | ○ |
| 1 | X01 | Y01 | ○ |
| 11 | X08 | Y08 | × |
| M-TH (EVEN NUMBER) PAGE LAYOUT | | | |
| 4 | X04 | Y04 | ○ |
| 5 | X05 | Y05 | ○ |
| N | X09 | Y09 | × |
| N+1 | X10 | Y10 | × |
| 6 | X06 | Y06 | ○ |
| 7 | X07 | Y07 | ○ |

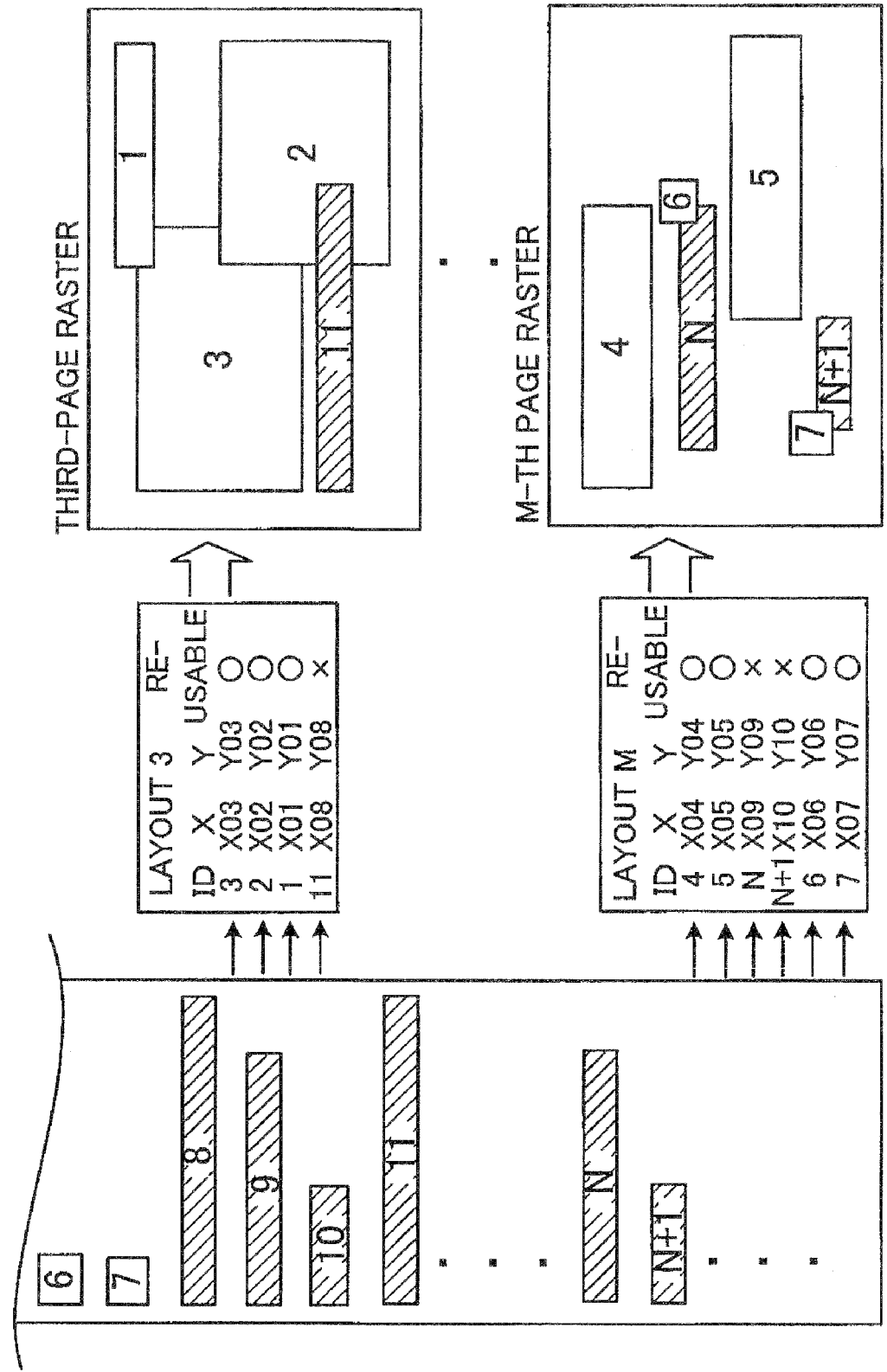

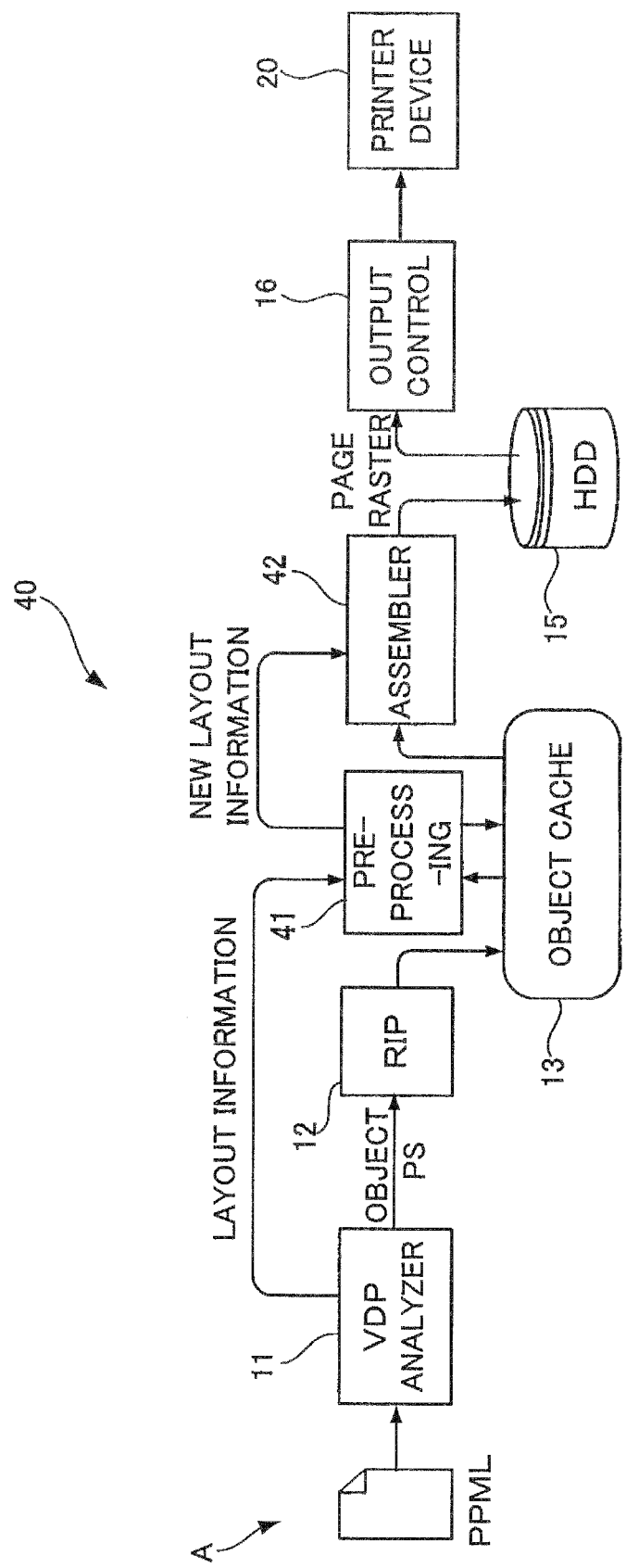

IMAGE DATA PROCESSOR AND IMAGE DATA PROCESSING PROGRAM STORAGE MEDIUM

BACKGROUND OF THE INVENTION

1. Field of the invention

The present invention relates to an image data processor for generating a page raster that is image data rasterized by each page based on page description data described in page description language for variable printing, and an image data processing program storage medium storing an image data processing program that causes an information processing apparatus to operate as the image data processor.

2. Description of the Related Art

For example, there have been variable printing in which a variable object that is an image object used only once on a particular page is combined with a reusable object that is an image object used repeatedly over plural pages. One application of the variable printing is, for example, an advertisement addressed to a different individual name but contents of which is almost the same, for example, formed by picture patterns.

Generally in the variable printing, plural image objects need to be merged by each page, which is time-taking processing and thus speeding-up of the processing is desired.

Japanese Patent Application Publication No. 2005-210395 proposes a technique of speeding up RIP (rasterize) processing for generating an object raster in the variable printing. However, the proposition described in the above-identified publication employs a method of arranging objects sequentially one by one, at each position in the order specified in PPML input in the printing system, in regard to the processing of generating a page raster by merging object rasters, and does not describe any special technique in speeding up merge processing.

Therefore, in the processing method proposed in the above-identified publication, when there are plural objects that are commonly used over pages (reusable object), processing of arranging same objects at same positions by each page (merge) is generated.

Merging objects consists of processing of (1) Obtaining an object image, (2) Calculating a cut region of the object, (3) Calculating an arrangement area of a page, and (4) Merging an effective area of the object on a predetermined position of the page. Of the four processing, (1) to (3) are overhead processing. In merging images having a same area (size), productivity declines when many small objects that are cut into small pieces are arranged, by the number of times overhead processing is performed, compared to a case where a few large objects are arranged.

SUMMARY OF THE INVENTION

The present invention has been made in view of the above circumstances and provides an image data processor and an image data processing program storage medium that eliminate unwanted overhead processing and improve productivity in image merge processing.

According to a first aspect of the invention, there is provided an image data processor including:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having information of arrangement positions by each page of the image objects specified by the page description data;

a rasterizing section that receives the object data generated in the data analyzing section and rasterizes each image object in the object data, thereby generates an object raster that is object data in a rasterized form of each image object;

a pre-processing section that generates, based on the layout information generated in the data analyzing section, in regard to a group of reusable objects appearing in a range from a lowermost layer to a layer immediately before a variable object appears in the order of arranging image objects, one new object raster for each group of pages on which reusable objects constituting the group of reusable objects are identical and have same arrangement positions, the new object raster being object data in a rasterized form of a new reusable object generated by merging the reusable objects constituting the group of reusable objects, the pre-processing section also generating new layout information by replacing description of each of the reusable objects constituting the group of reusable objects in the layout information with description of a new reusable object corresponding to the group of reusable objects; and an assembling section that assembles the object raster generated in the rasterizing section and the new object raster generated in the pre-processing section by each page, based on the new layout information generated in the pre-processing section, thereby generating a page raster representing a rasterized image by each page.

The feature of the image data processor of the present invention lies in incorporating the pre-processing section. That is, since the pre-processing section generates the new object raster along with the new layout information, the assembling section is only required to arrange the one new object raster that is a reusable object, in stead of sequentially assembling (merge) plural object rasters of the plural reusable objects, thereby realizing an effective image merge processing.

In the image data processor, it is preferable that the pre-processing section generates a new object raster having a same size as the page, and at the same time generates new layout information of which description has been replaced with description of a new reusable object having a same size as the page.

In this case, it is possible to eliminate the clearance of the page buffer to zero to be used as a working area for arranging image objects sequentially, for a page on which a new reusable object is placed.

It is preferable that the image data processor further includes an output control section that outputs a page raster generated in the assembling section to a printer that prints a visual image based on the page raster.

By this feature, it is possible to output an output page raster generated in the image data processor of the present invention directly to a printer.

According to a second aspect of the invention, there is provided an image data processing program storage medium storing an image data processing program, which is executed in an information processing apparatus and causes the information processing apparatus to operate as an image data processor, the image data processor including:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having information of arrangement positions by each page of the image objects specified by the page description data;

a rasterizing section that receives the object data generated in the data analyzing section and rasterizes each image object in the object data, thereby generates an object raster that is object data in a rasterized form of each image object;

a pre-processing section that generates, based on the layout information generated in the data analyzing section, in regard to a group of reusable objects appearing in a range from a lowermost layer to a layer immediately before a variable object appears in the order of arranging image objects, one new object raster for each group of pages on which reusable objects constituting the group of reusable objects are identical and have same arrangement positions, the new object raster being object data in a rasterized form of a new reusable object generated by merging the reusable objects constituting the group of reusable objects, the pre-processing section also generating new layout information by replacing description of each of the reusable objects constituting the group of reusable objects in the layout information with description of a new reusable object corresponding to the group of reusable objects; and an assembling section that assembles the object raster generated in the rasterizing section and the new object raster generated in the pre-processing section by each page, based on the new layout information generated in the pre-processing section, thereby generating a page raster representing a rasterized image by each page.

Also in the image data processing program storage medium, it is preferable that the pre-processing section generates a new object raster having a same size as the page, and at the same time generates new layout information of which description has been replaced with description of a new reusable object having a same size as the page.

Further, in the image data processing program storage medium, it is also preferable that the image data processor further includes an output control section that outputs a page raster generated in the assembling section to a printer that prints a visual image based on the page raster.

As described above, according to the present invention, it is possible to eliminate unwanted overhead processing by reducing a total number of objects to be arranged, and improve productivity in image merge processing.

BRIEF DESCRIPTION OF THE DRAWINGS

Exemplary embodiments of the present invention will be described in detail based on the following figures, wherein:

FIG. 2 indicates a sample of layout information generated in a VDP analyzer;

FIG. 7 is a flowchart illustrating processing in a pre-processing section;

DETAILED DESCRIPTION

At first, variable printing processing in a conventional method of merging raster under the POD (Print On Demand) print system is briefly described, followed by description of variable printing processing according to the present invention.

Figure 1:
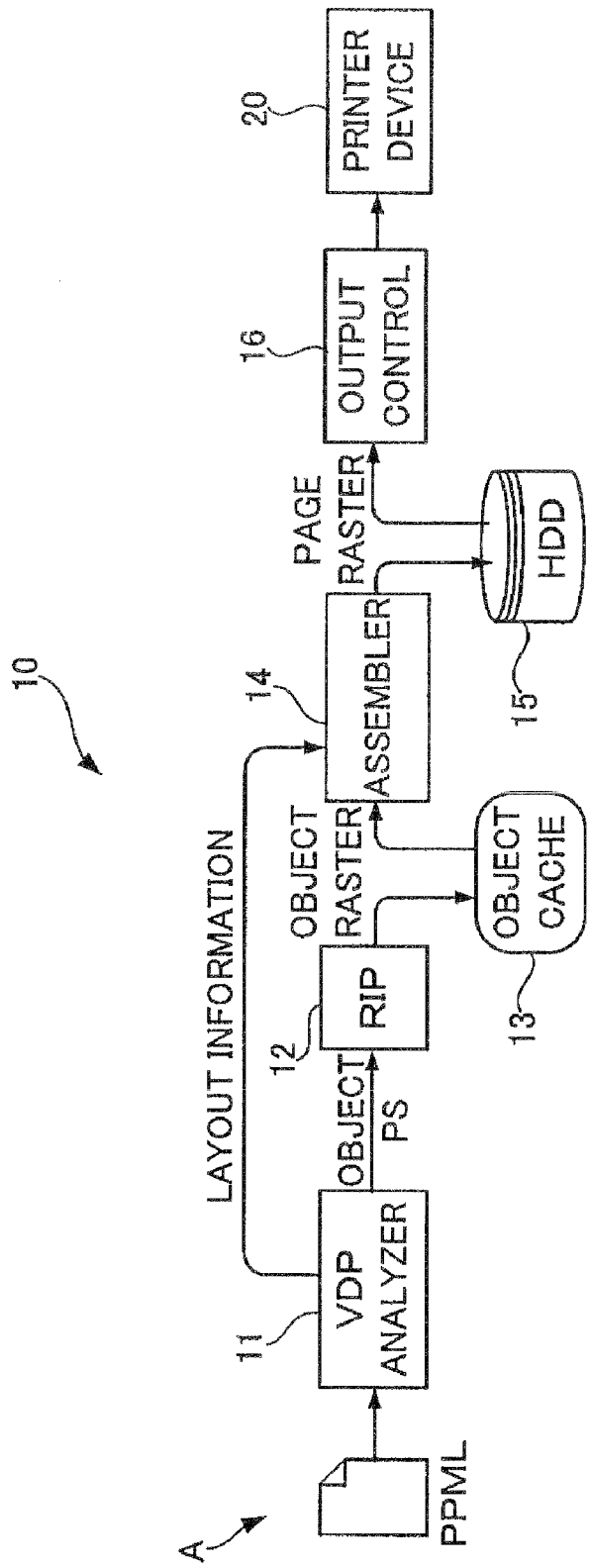
FIG. 1 is a functional block diagram of a conventional type of image data processor that performs variable print processing.

FIG. 1 is a functional block diagram of a conventional image data processor that performs variable print processing. This type of image data processor has a function realized by combination of the hardware of an information processing apparatus such as a computer and a conventional image data processing program when the conventional image data processing program is executed in the image processing apparatus.

When PPML data A that is described in page description language called as PPML for describing variable printing is input to an image data processor 10, the PPML data A is analyzed in a VDP analyzer 11 at first, to generate layout information and object PS (PostScript).

The layout information describes where in the output page area an object specified by an object ID should be arranged. It is a list of object IDs to be arranged and their arrangement positions by each page.

In addition, the object PS is the one generated as a single postscript file by gathering objects that are included or referred to externally in the PPML.

The object PS generated in the VDP analyzer 11 is input to a RIP (Raster Image Processor) 12 where the object PS is rendered (rasterized) and an object PS that is an image object in a rasterized form is generated. This object raster is once saved in an object cache 13.

In addition, the layout information generated in the VDP analyzer 11 is referred to by an assembler 14. This assembler 14 retrieves from the object cache 13 an object raster specified by an object ID according to description of the layout information and merges the retrieved object raster at a specified position on an output page area. The concept of this "merge" will be described later. Merging of the object raster generates a page raster of representing image data of one page in a rasterized form. The page raster is saved in a nonvolatile memory section (HDD 15).

When image data is printed, the page raster in a compressed form is read from the HDD 15 and sent to a printer device 20 by an output control section 16. In the printer device 20, printing is performed based on the page raster that has been sent.

Incidentally, details of the VDP analyzer 11 and the RIP 12 are disclosed in Japanese Patent Application Publication No. 2005-210395.

FIG. 2 indicates a sample of layout information generated in the VDP analyzer 11. Hereafter, descriptions will be made referring to this sample.

In the sample indicated in FIG. 2, flag information is described showing whether each object indicated by object ID is a reusable object (O) or a variable object (X). The flag is used as one of parameters to specify an object in the processing for retrieving an object raster from the object cache 13.

The sample indicated in FIG. 2 has the following construction.

The object IDs 1-7 are reusable objects and other objects 8 or later are variable objects. The IDs of the variable objects are arranged in the ascending order on an output page where the variable objects are arranged.

Odd number pages (page 1 and page 3 in this sample) are formed by reusable objects (ID=1, 2, 3) and one variable object. Even number pages (page 2 and page 4 in this sample) are formed by reusable objects (ID=4, 5, 6, 7) and two variable objects. The layout of objects is the same between odd number pages, having the same reusable objects and different variable objects. However, some odd number pages may have variable objects in a different size.

Also, even number pages have the same layout of objects, but have different variable objects. However, similarly, some even number pages may have variable objects in a different size.

The assembler 14 merges an object raster in the order described in the layout information of FIG. 2 and generates a page raster.

More particularly, on odd number pages, the reusable objects IDs 3, 2, 1 and the variable object ID 8 on page 1 (the variable object ID 11 on page 3) are merged in this order.

In addition, on even number pages, reusable object IDs 4,5, the first variable object (ID 9 in page 2, and ID N in page M), the second variable object (ID 10 in page 2, ID N+1 in page M), reusable object IDs 6 and 7 are merged in this order.

As the object PS describes objects in the order of object IDs, an object raster is saved in the object cache 13 with the serial numbers output from the RIP12 as object IDs.

Figure 3A:
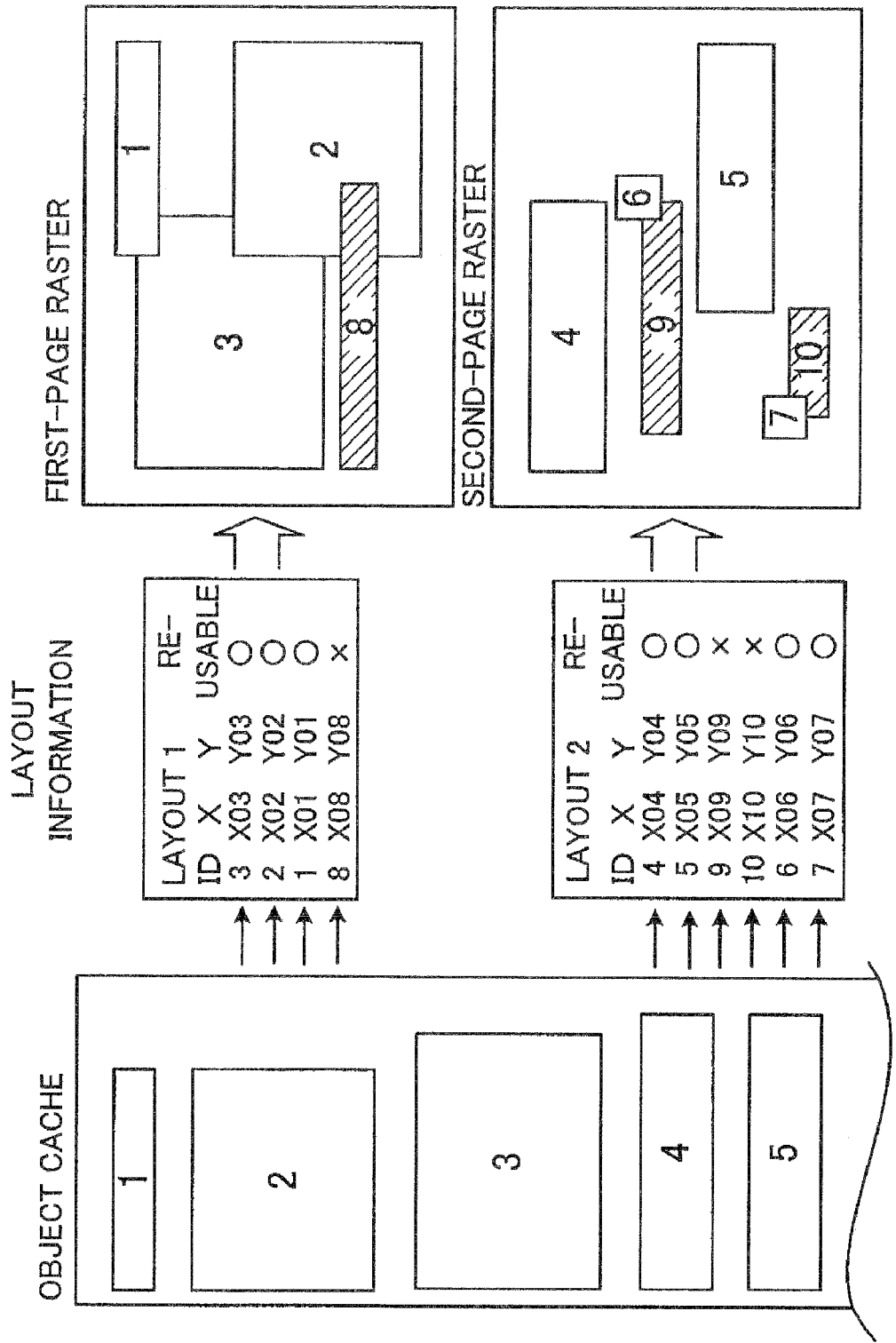
FIG. 3 is a drawing indicating a concept when a page raster is generated by merging object rasters based on the sample layout information indicated in FIG. 2.

FIG. 3 is a drawing indicating a concept when a page raster is generated by merging object rasters based on the sample layout information indicated in FIG. 2.

In FIG. 3, the left column indicates object rasters saved in the object cache 13, and the center column indicates layout information generated in the VDP analyzer 11. More particularly, the layout information indicated in FIG. 3 Includes page layouts 1, 2, 3, . . . M for the pages 1, 2, 3, M corresponding to the sample shown in FIG. 2.

Figure 4:
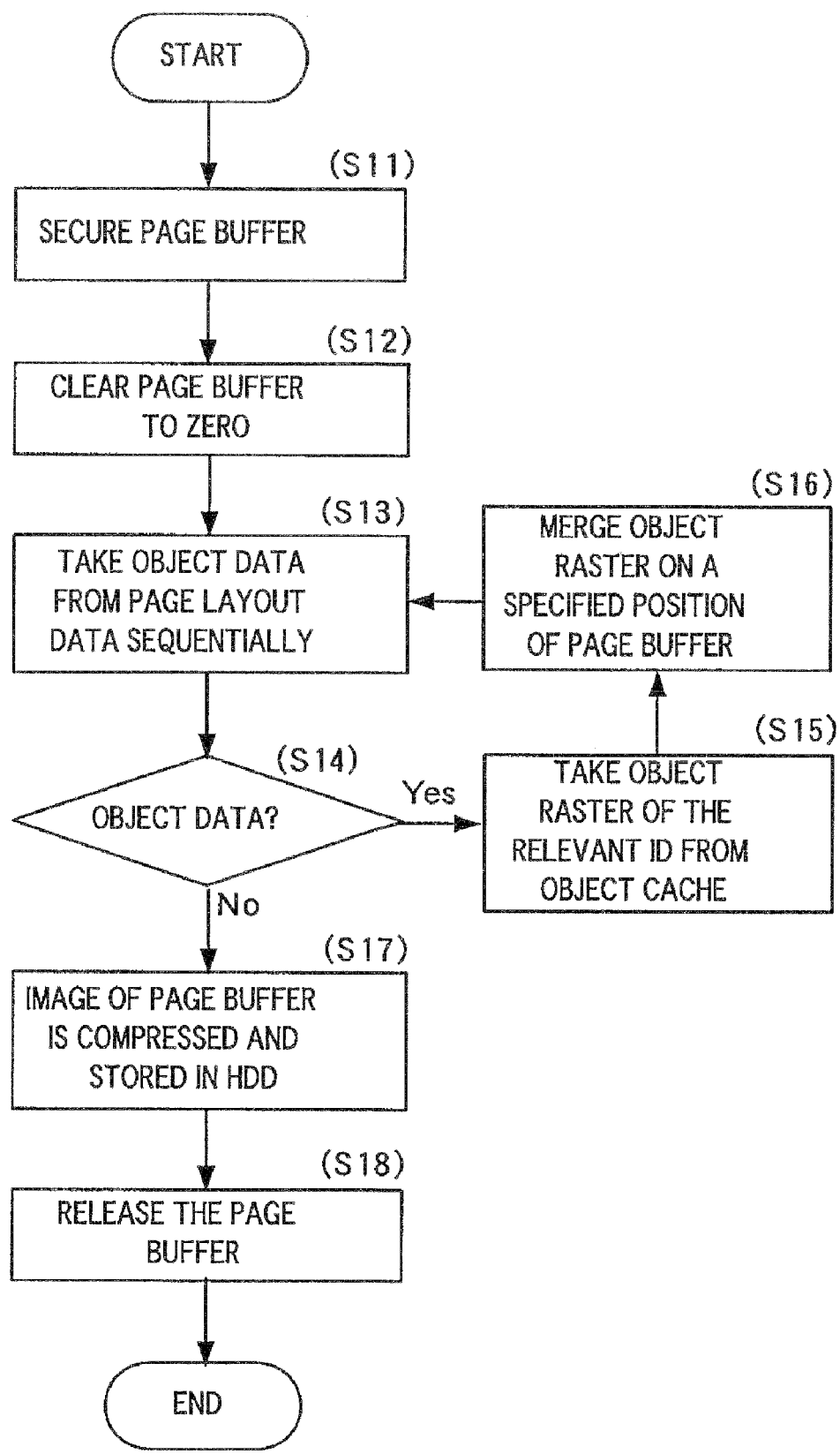
FIG. 4 is a flowchart indicating the outline of merge processing.

FIG. 4 is a flowchart indicating the outline of merge processing in the assembler 14.

The assembler 14 repeats assemble processing (generating a page raster by merging plural object rasters) by each page layout forming layout information, starting from the first page to the last page. Here, assemble processing is described referring to the first page as an example. It should be noted that each one page requires printing in four colors of C, M, Y, and K. The following procedure is performed for each color.

A memory area (a page buffer) for generating a page raster is secured (step S11).

The page buffer is cleared to zero (step S12).

The first object information is taken out from the first page layout information (object ID=3) (step S13).

In this case, as there is object information (object ID=3) (step S14: Yes), the object raster whose ID is 3 is taken out from the object cache 13 (step S15).

The object raster whose ID is 3 is merged at a position (X03, Y03) on a page buffer as a starting point (step S16).

Next object information is taken out from the first page layout information (object ID=2) (step S13).

As there is object information (object ID=2) (step S14), the object raster whose ID is 2 is taken out from the object cache 13 (step S15).

The object raster whose ID is 2 is merged at a position (X02, Y02) on the page buffer as a starting point (step S16).

Further, the next object information (object ID=1) is taken out from the object cache 13 (step S13).

As there is object information (object ID=1) (step S14), the object raster whose ID is 1 is taken out from the object cache 13 (step S15).

The object raster whose ID is 1 is merged at a position (X01, Y01) on the page buffer as a starting point (step S16).

Next object information is taken out from the first page layout information (object ID=8) (step S13).

As there is object information (object ID=8) (step S14), the object raster whose ID is 8 is taken out from the object cache 13 (step S15). The object raster whose ID is 8 is merged at a position (X08, Y08) on the page buffer as a starting point (step S16).

Again, an attempt to take out the next object information from the first page layout information is made (step S13). However, as there is no object information left, the processing goes to step S17.

The contents of the page buffer (completed page raster) is saved in the HDD 15 (step S17).

The page buffer is cleared (step S18).

Next, merge processing of an object raster will be described.

Figure 5:
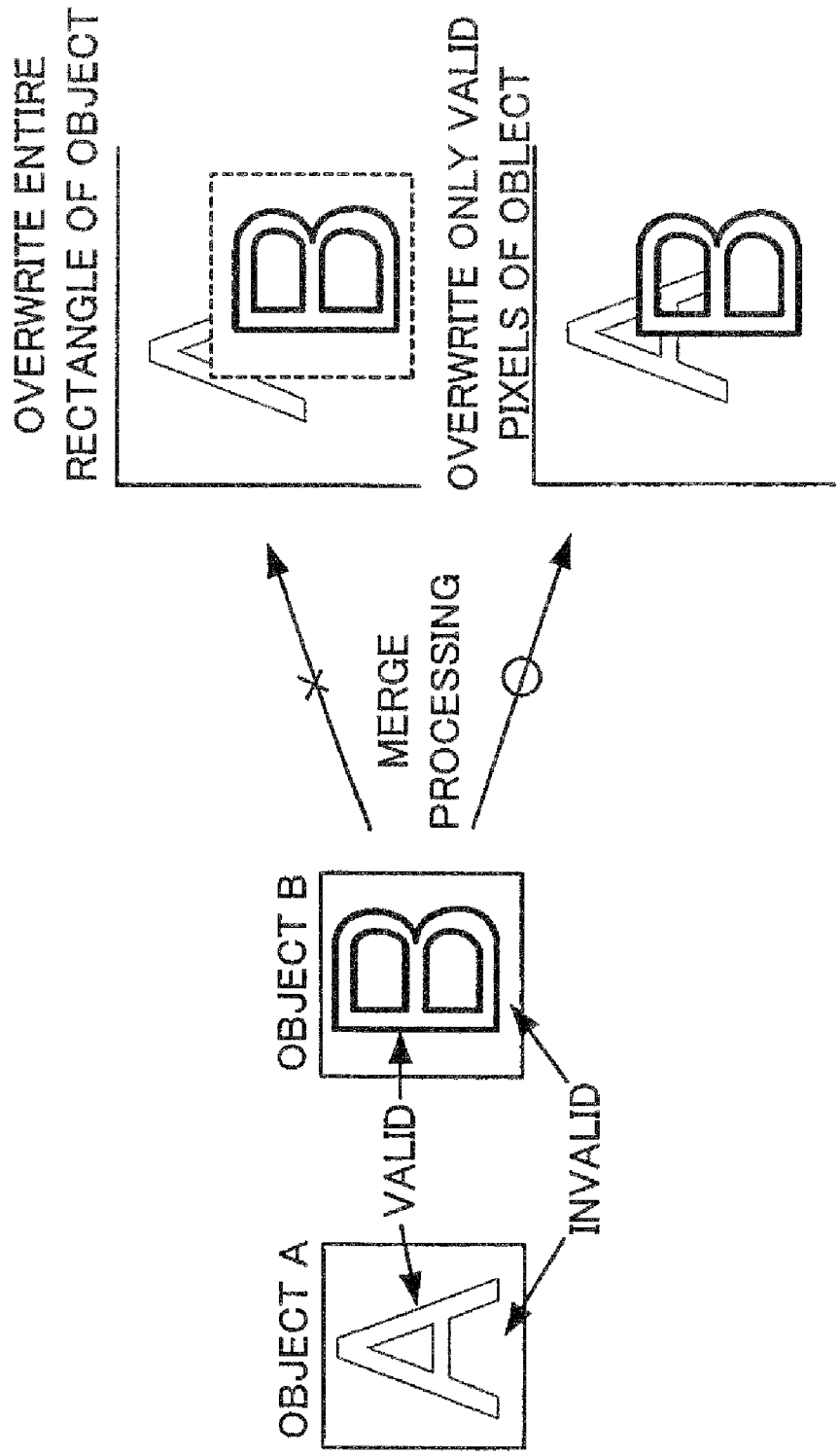
FIG. 5 is an explanation of merge processing of an object raster.

FIG. 5 is an illustration of merge processing of an object raster.

An object raster is a rectangular bitmap. However, the rectangular bitmap is not all valid and contains both an invalid region (pixels) and a valid region (pixels).

Merge processing is performed such that the valid pixels of an object raster are written over a page buffer and no action is taken for the invalid pixels.

An object raster is processed before being saved in an object cache in such a way that the pixel value≠0 indicates "validity" while the pixel value=0 indicates "invalidity." In other words, if an original pixel value=0 is valid, the object raster is processed to change the pixel value from 0 to 1 forcibly.

FIG. 5 indicates the state of a page buffer where the object raster of an object A is written in the page buffer and the object raster of an object B is written over the object A.

As shown in the lower right side of FIG. 5, processing of overwriting only valid pixels of the object is referred to as merge processing.

The merge processing, i.e., detecting valid pixels of the rectangular bitmap and arranging the valid pixels in a page buffer is heavy processing, as it requires the heaviest usage of a CPU in the processing of an assembler.

On the other hand, processing indicated in the upper right side of FIG. 5 arranges (overwrites) all the pixels of the rectangular bitmap in the page buffer and is very light, requiring almost no usage of a CPU.

This concludes the description the conventional variable print processing. Next, an embodiment of the present invention will be described.

Figure 6:
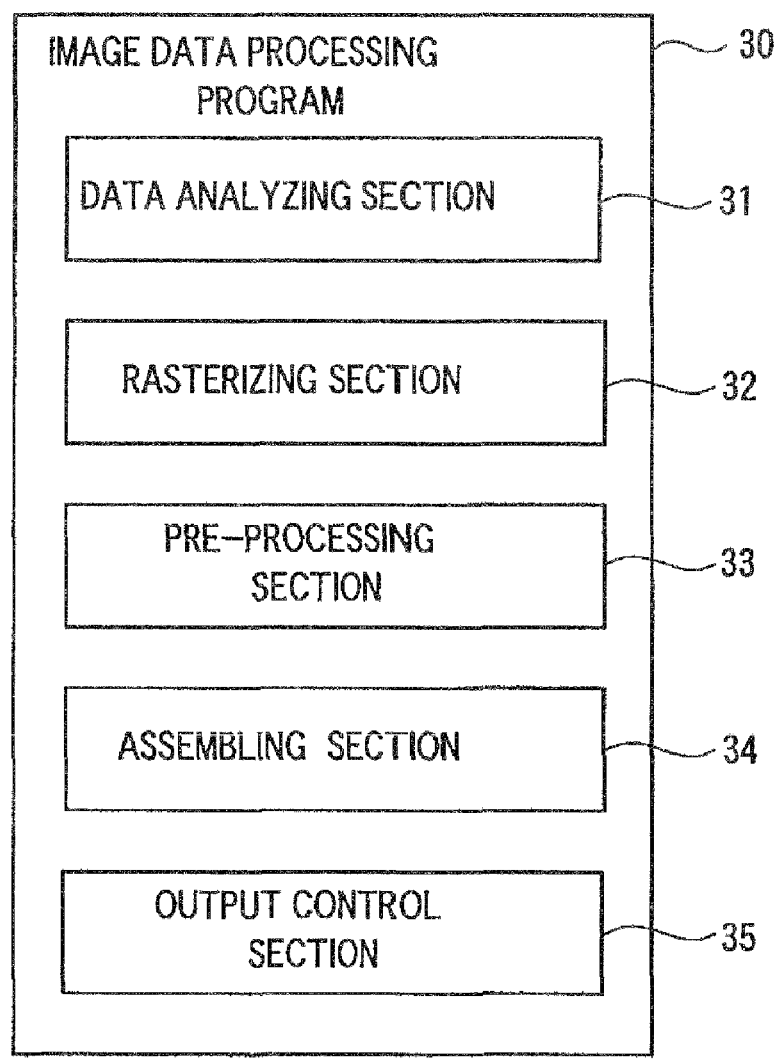
FIG. 6 indicates the outline of an image data processing program according to one embodiment of the present invention.

FIG. 6 indicates the outline of an image data processing program according to one embodiment of the present invention.

An image data processing program 30 indicated in FIG. 6 consists of program elements including a data analyzing section 31, a rasterizing section 32, a pre-processing section 33, an assembling section 34, and an output control section 35. FIG. 7 is a functional block diagram of an image data processor realized in an information processing apparatus for executing a program such as a computer when the image data processing program 30 in FIG. 6 is executed in the information processing apparatus.

In other words, each element indicated in FIG. 7 is a function realized by a combination of the hardware of an information processing apparatus and program elements forming the image data processing program 30 indicated in FIG. 6 that are implemented in the information processing apparatus.

An image data processor 40 indicated in FIG. 7 includes an additional element of a pre-processing section 41 compared with the conventional image data processor 10 in FIG. 1. Since other elements of the image data processor 40 have same functions as those of the corresponding elements of the conventional image data processor 10, they are denoted by the same reference numerals as those of the conventional image data processor 10 in FIG. 1.

The data analyzing section 31 that is a program element of the image data processing program 30 indicated in FIG. 6 has a function of receiving, when executed in an information processing apparatus, information specifying a reusable object that is an image object repeatedly used over plural pages; information specifying a variable object that is an image object used only once on a particular page; and page description data described in page description language for variable printing that describes arrangement positions on each page of image objects formed of the reusable objects and variable objects. The data analyzing section 31 also has a function of generating object data in which image objects specified by the page description data are gathered, and layout information in which arrangement positions of the image objects specified by the page description data are gathered. In other words, the data analyzing section 31 is a program element that realizes the VDP analyzer 11 indicated in FIG. 7.

Additionally, the rasterizing section 32 of the image data processing program 30 receives, when executed in an information processing apparatus, object data generated in the data analyzing section 31 (VDP analyzer 11) and generates each object raster that is object data in a rasterized form of each image object. In other words, the rasterizing section 32 is a program element realizing the RIP 12 indicated in FIG. 7.

Further, the pre-processing section 33 of the image data processing program 30 has a function of generating a new object raster and new layout information, when executed in an information processing apparatus. The new object raster to be generated is object data in a rasterized form of a new reusable object formed by merging each reusable object constituting a group of reusable objects. The pre-processing section 33 generates one new object raster for each group of pages on which same reusable objects are arranged and arrangement positions of the reusable objects are the same over the pages, based on the layout information generated in the data analyzing section 31, in regard to groups of reusable objects appearing in a lowermost portion in the order of image object arrangement immediately before a variable object appears. The pre-processing section 33 also generates new layout information by replacing description of each reusable object constituting a group of reusable objects in layout information with description of a new reusable object corresponding to the group of reusable objects. The pre-processing section 33 is a program element realizing the pre-processing section 41 indicated in FIG. 7.

The pre-processing section 33 (pre-processing section 41) generates a new object raster having a same size as the page, and also generates new layout information in which description of each reusable object has been replaced with description of a new reusable object having a same size as the page.

Further, the assembling section 34 of the image data processing program 30 assembles, when executed in an information processing apparatus, an object raster (including a new object raster) by each page, based on the new layout information. Thus, the assembling section 34 has a function of generating a page raster representing a rasterized image by each page. Here, a data form of the storage layout information is the same as that of layout information generated in the data analyzing section 31 (VDP analyzer 11). Thus, the assembler 42 indicated in FIG. 7 has the same function as that of the assembler 14 indicated in FIG. 1. The assembling section 34 is a program element realizing the assembler 42 indicated in FIG. 7.

Furthermore, the output control section 35 of the image data processing program 30 is a program element realizing a function of outputting a page raster generated in the assembling section 34 (assembler 42) to a printer for printing a visual image based on the page raster. The output control section 35 forms the output control section 16 indicated in FIG. 7.

In the following, explanation will be made about the image data processor 40 indicated in FIG. 7, focusing attention on processing of the pre-processing section 41 added to the conventional image data processor 10 indicated in FIG. 4.

In the present embodiment, description of the outline will be made referring to the sample of the layout information indicated in FIG. 2.

The present embodiment employs a method in which an object raster saved in the object cache 13 is pre-processed in the pre-processing section 41 prior to the processing in the assembler 14 so that a total amount of processing in the assembler 42 can be reduced.

In the sample illustrated in FIG. 2, on all the odd number pages, merge processing is always performed for object rasters of object IDs 3, 2, and 1 in this order. Therefore, at the time of arranging the object IDs 3, 2, and 1, page rasters on the odd number pages always show a same picture pattern. A different picture pattern appears when a variable object is placed.

Similarly, on all the even number pages, merge processing is always performed for object rasters of object IDs 4 and 5 in this order. Therefore, at the time of arranging the object IDs 4 and 5, page rasters on the even number pages always show a same picture pattern. A different picture pattern appears when a variable object is placed.

In this way, the present embodiment employs the method in which a set of layout that has a same object arrangement over several pages is found and a new object is generated in accordance with the set, and a page raster is generated by using the new object.

When the new object is generated, it is generated in the size of the page. Since a new object is always arranged at lowermost in the order of object layout, generating the new object in the page size can eliminate processing of clearing page buffer to zero in the assemble processing.

Here, in the layout information, a group of reusable objects appearing from the lowermost immediately before a group that includes a variable object appears is referred to as "lower layout" and a list of the lower layout is referred to as "a list of lower layout".

Figure 8A:
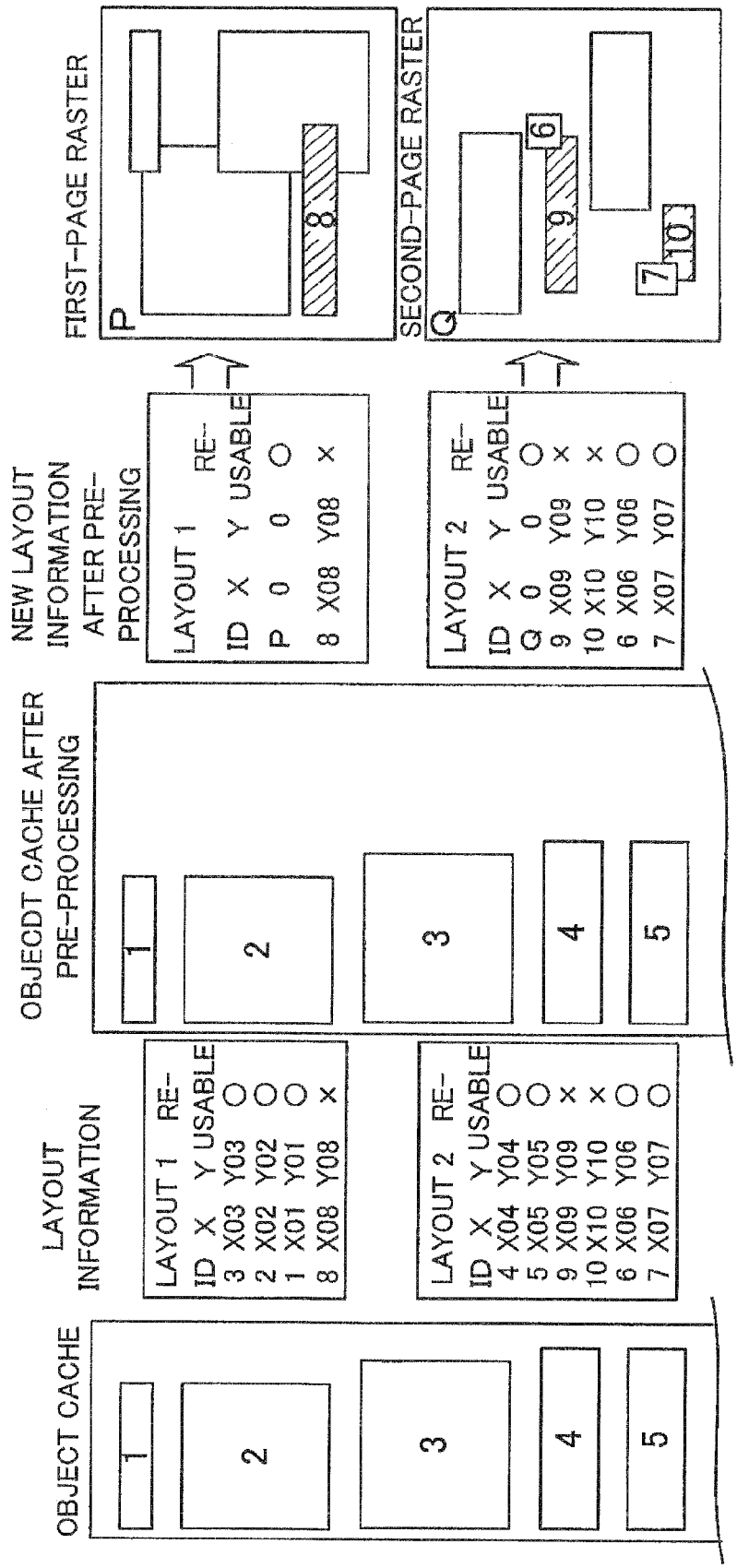
FIG. 8 indicates processing in a pre-processing section 41 based on the sample in FIG. 2.
Figure 8B:
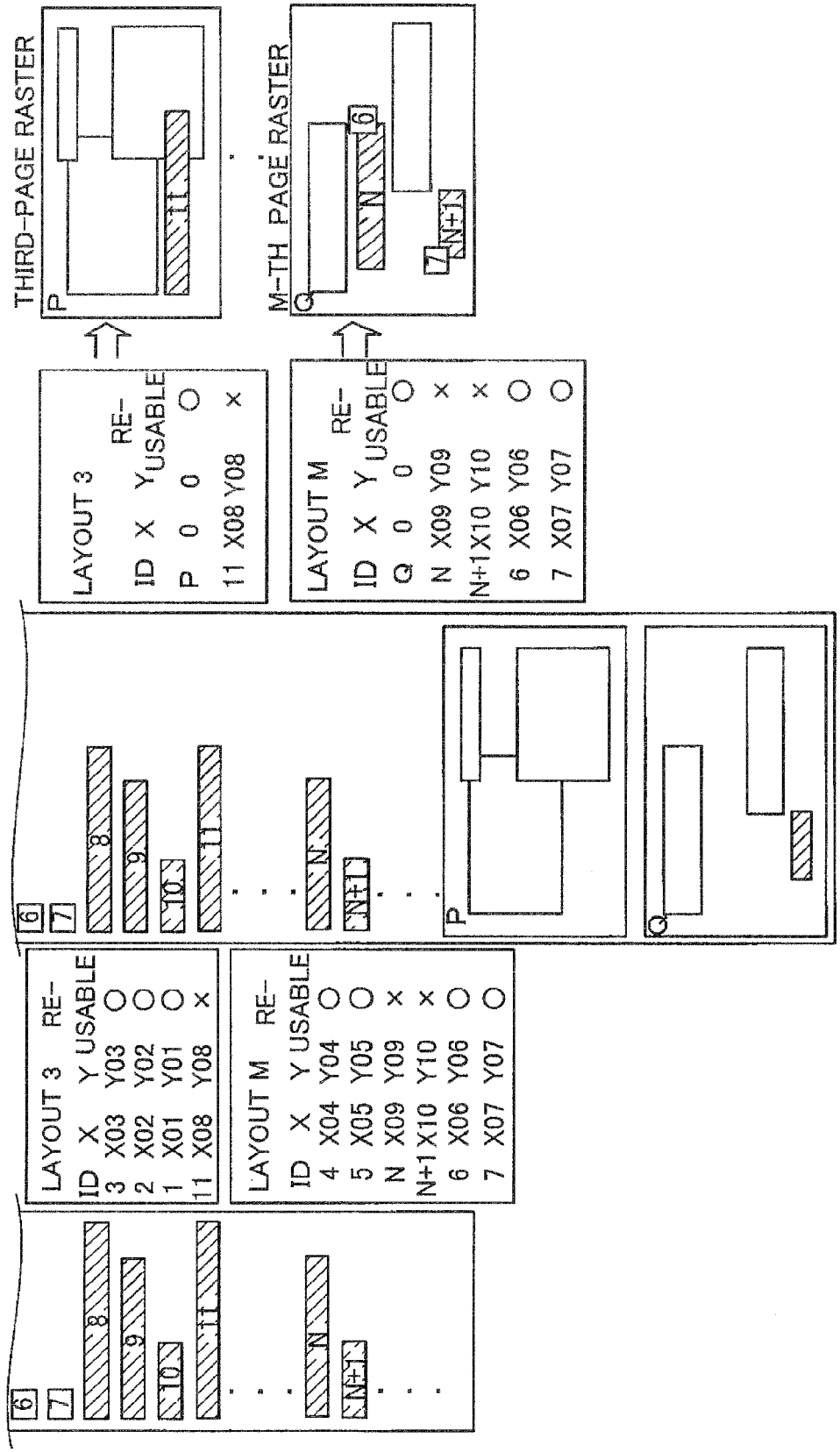

FIG. 8 illustrates the processing of the pre-processing section 41 based on the sample in FIG. 2.

The left column indicates an object cache in which object rasters generated in the RIP 12 are saved, before the pre-processing section 41 performs the processing. The object cache is the same as the one indicated in FIG. 3. The object IDs 1-7 are reusable objects, and the object ID 8 or later are variable objects.

The second column from the left is layout information generated in the VDP analyzer 11. The layout information is the same as the one indicated in FIG. 3.

Among the layouts by each page constituting the layout information, in layouts 1 and 3, reusable objects of IDs 3, 2, 1 are arranged from lower side in the order of IDs 3, 2, 1. The preprocessing section 41 merges these reusable objects of IDs 3, 2, 1, generates a new object (ID=9) in the page size and saves it in the object cache. At the same time, the pre-processing section 41 arranges information of a new object of ID=P in place of the reusable objects of IDs 3, 2, 1 in the layouts 1 and 3 as a new layout information.

Similarly, in layouts 2 and M constituting the layout information, reusable objects of IDs 4 and 5 are arranged from lower side in the order of IDs 4 and 5. However, since variable objects (ID=9, ID=N) are arranged after the reusable object of ID=5, reusable objects of IDs 6 and 7 that are placed further above the IDs 4, 5 are excluded.

The pre-processing section 41 merges these reusable objects of IDs 4 and 5, generates a new object (ID=Q) in the page size and saves it in the object cache. At the same time, the pre-processing section 41 arranges information of the new object of ID=Q in place of the reusable objects of IDs 4 and 5 in the layouts 1 and 3 as new layout information.

In the assembler 42 in FIG. 7, assembling (merge) is performed based on the new layout information to generate page rasters by each page. This processing eliminates the need to repeat merging of same portions (merging for generating IDs=P, Q), thereby enabling fast processing.

Figure 9:
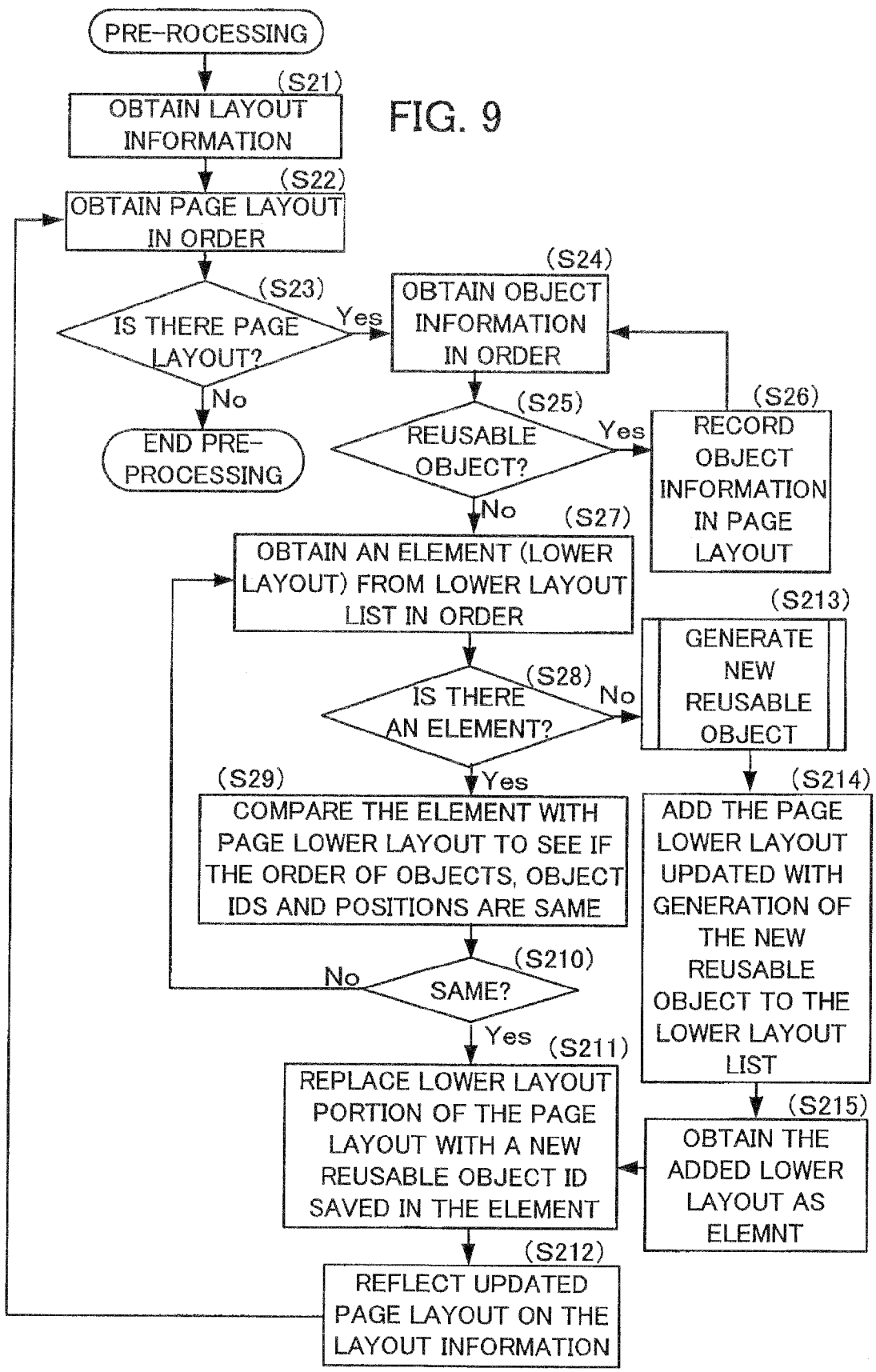
FIG. 9 is a flowchart illustrating processing in the pre-processing section.

FIG. 9 is a flowchart indicating a processing procedure in the pre-processing section 41.

In the pre-processing section 41, at first layout information is obtained (step S21). Then, layouts of each page constituting the layout information are sequentially obtained one by one (step S22), and the following procedure is repeated until when there is no unprocessed page layouts left.

Object information is obtained sequentially from the layouts of one page that are obtained this time (step S24). If the obtained object information represents a reusable object (step S25. Yes), object information of the reusable object is recorded in lower layout of the page (step S26), and next object information is retrieved from the page layout in the middle of processing (step S24). This retrieval of object information is repeated. If the retrieved object is not a reusable object (step S25: No), an element of the lower layout list (already generated lower layout) is obtained sequentially from the lower layout list that is a list of already generated lower layouts (step S27). Meanwhile, if there is an obtained element (step S28: Yes), a comparison is made between the lower layout of one page generated this time through the repetition of steps S24 to S26 and the elements in the lower layout list obtained in step S27 to determine order of objects, each object ID, and arrangement positions are the same (step S29). If there is any difference, even if slightly (step S210: No), the procedure goes back to step S27 and a next element is retrieved from the lower layout list and the comparison is repeated. This comparison is repeated (step S29) until when there is no element left to be retrieved from the reusable layout list (step S28: No). On the other hand, if order of objects, each object ID, and arrangement positions are the same (step S210: Yes), then object information constituting the lower layout in the page layout in the middle of processing is replaced with an ID of a new reusable object saved in the element retrieved from the lower layout list. At this time, arrangement position of the new reusable object is defined as X=0, Y=0 (step S211). This replacement, i.e., update of the page layout is reflected on the layout information (step S212), and then a next page layout is processed (step S22).

When there is no element to be retrieved from the lower layout list (step S28: No), a new reusable object is generated (step S213).

Figure 10:
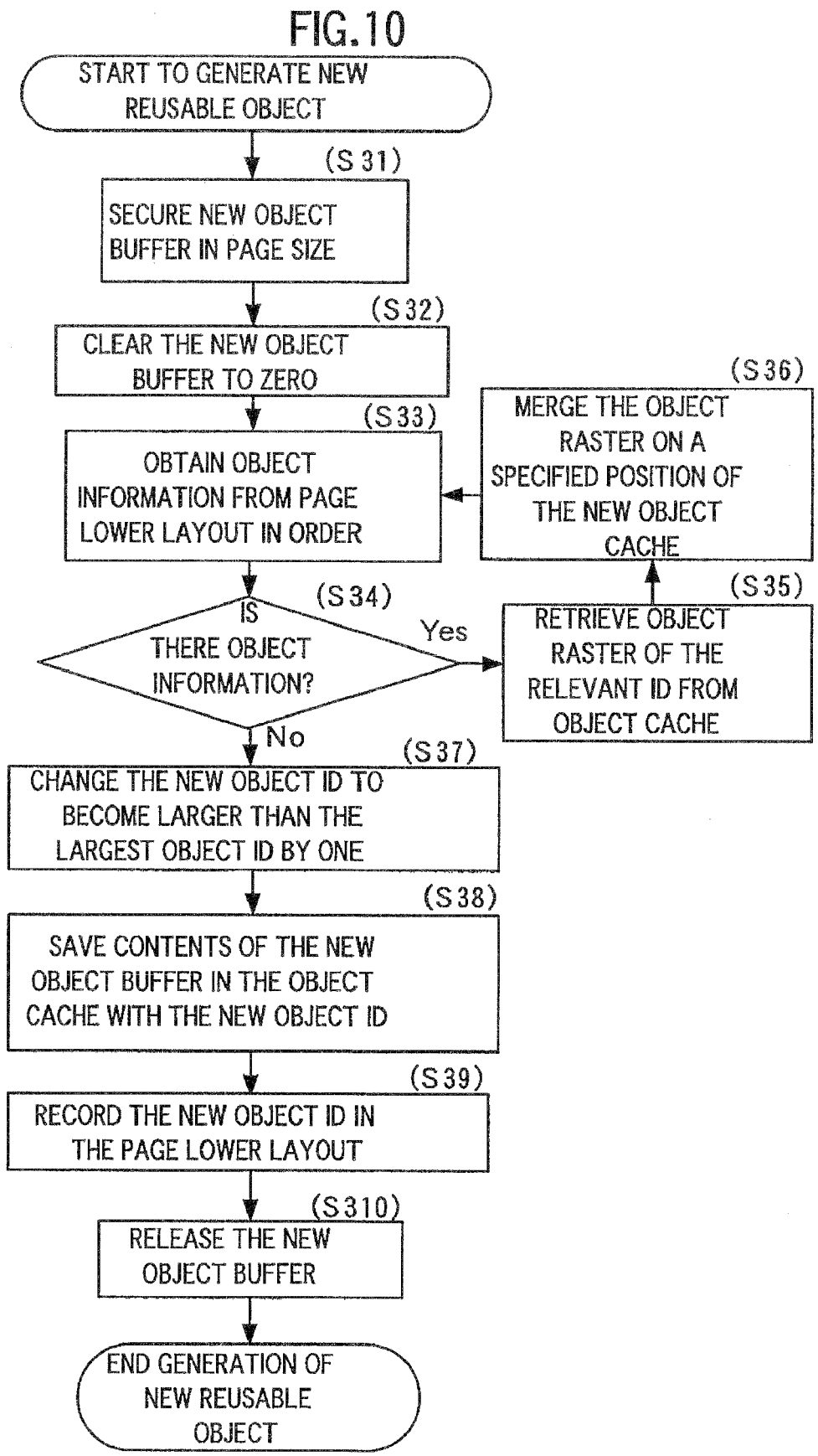
FIG. 10 is a flowchart illustrating processing of generating a new reusable object.

FIG. 10 is a flowchart illustrating processing of generating a new reusable object in step S213 of FIG. 9.

At first, a new object buffer is secured in the size of page (step S31), and the new object buffer is cleared to 0 (step S32). Then, through the repetition of steps S24 to S26, object information is obtained sequentially from the lower layout of one page that is generated this time (step S33). If there is object information of the obtained object (step S34: Yes), an object raster corresponding to the ID of the obtained object is retrieved from the object cache 13 (step S35). The retrieved object raster is merged at a specified position of the new object buffer. When there is no unprocessed object information in the lower layout of one page to be processed (step S34: No), the object ID of the newly generated reusable object is changed to become larger than the largest object ID by one (step S37) and contents of the new object buffer is saved into the object cache 13 with the new ID (step S38). The lower layout of one page is updated with the recording of the new ID (step S39). After that, the new object buffer is released (step S310), and the generation of the new reusable object is finished.

In this way, in step S213 of pre-processing illustrated in FIG. 9, a new reusable object is generated.

In step S214 in FIG. 9, the lower layout updated with the generation of the new reusable object is added to the lower layout list, and the newly added lower layout list this time is obtained as an element of the lower layout list (step S215). The procedure then goes to step S211 to replace object information constituting the lower layout with the ID of the new reusable object saved in the element obtained from the lower layout list (step S211), and this replacement is reflected on the layout information (step S212).

The pre-processing completes when layout of the final page constituting the layout information obtained in step S21 is processed (step S23).

Figure 11:
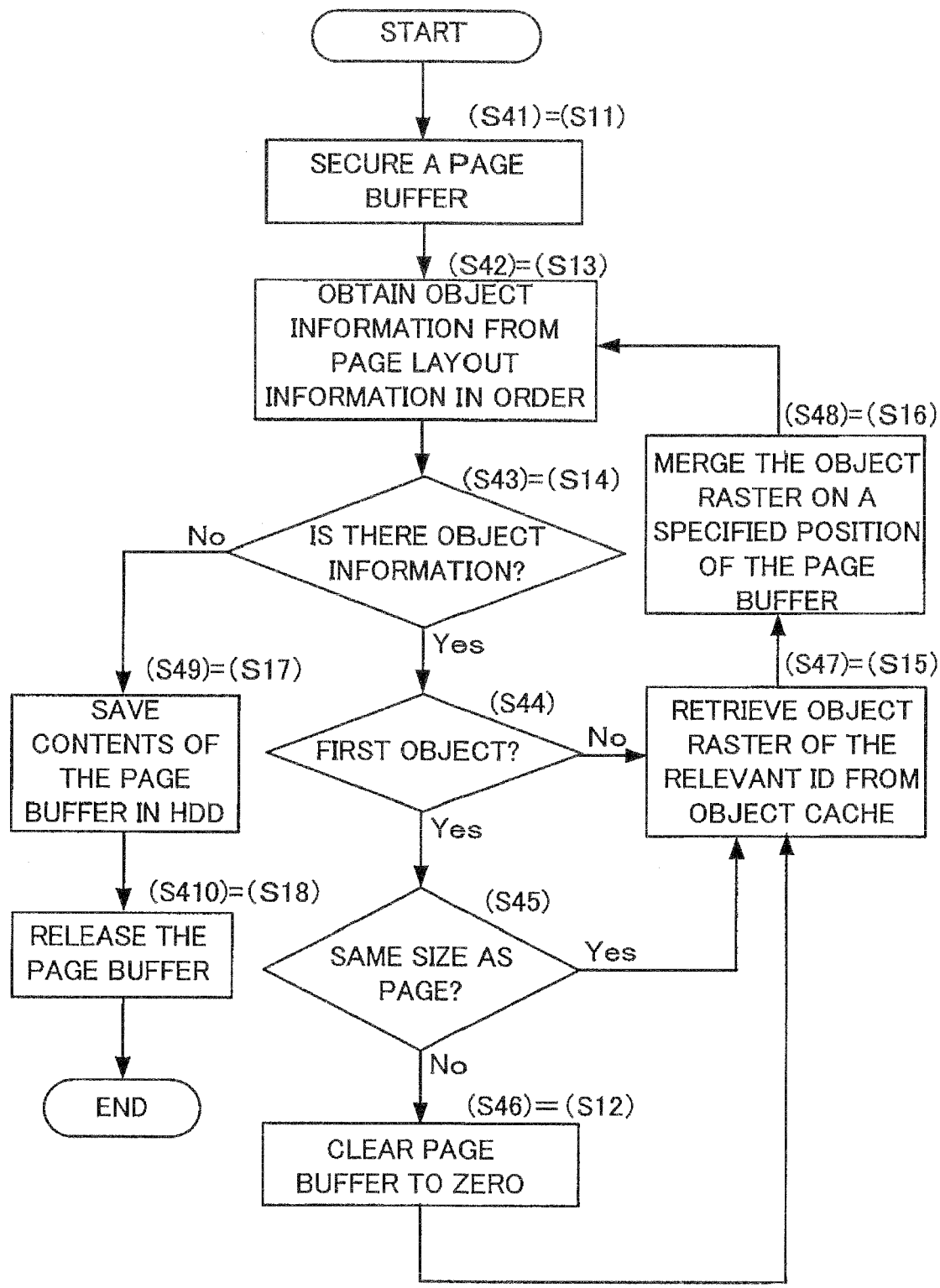
FIG. 11 is a flowchart illustrating processing in an assembler 2.

FIG. 11 is a flowchart illustrating processing in the assembler 42 indicated in FIG. 7.

Unlike the assembler 14 in FIG. 4 in which assembling is based on the layout information generated in the VDP analyzer 11, in the assembler 24 in FIG. 7, assembling is based on new layout information generated in the pre-processing section 41. However, the layout information and the new layout information share a same form and there is no difference in the form between the assembler 14 in FIG. 4 and the assembler 24 in FIG. 7. The difference between the assembler 14 and the assembler 24 is that the assembler 14 firstly secures page buffer and then clears the page buffer to zero (step S12 in FIG. 4), whereas the assembler 42 omits the clearance to zero except when assembling a special page formed of only variable objects without including a reusable object.

Steps S41, S46, S42, S43, and S47 to S410 in the flowchart of FIG. 11 are the same as steps S11 to S18 in the flowchart of FIG. 4, respectively. Hereafter, processing in steps S44, S45 that are added to the flowchart of FIG. 4 will be described.

In step S44, a judgment is made whether the object information obtained this time is information of an object to be arranged at the top of the page layout. If the object information is of a first object, then another judgment is made whether the object is the same size as the page (step S45). If the object is the same size as the page, processing of clearing the buffer to zero (step S46) is omitted.

As described above, the new reusable object is generated in the page size, and the new reusable object is arranged at the top of the page buffer. Therefore, by placing the new reusable object in the page buffer, initialization of the page buffer (zero clearance) can be omitted, which also contributes to speeding up of the processing. However, for a page in which no reusable object is placed (formed of only variable objects), the page buffer is cleared to zero before the placement, since there is no guarantee that a variable object is in the size of the page (step S46).

Other steps of assemble processing in FIG. 11 are the same as the assemble processing in FIG. 4, and thus descriptions are omitted to avoid redundancy.

What is claimed is:

1. An image data processor comprising:
    a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having information of arrangement positions by each page of the image objects specified by the page description data;
    a rasterizing section that receives the object data generated in the data analyzing section and rasterizes each image object in the object data, thereby generates an object raster that is object data in a rasterized form of each image object;
    a pre-processing section that generates, based on the layout information generated in the data analyzing section, in regard to a group of reusable objects appearing in a range from a lowermost layer to a layer immediately before a variable object appears in the order of arranging image objects, one new object raster for each group of pages on which reusable objects constituting the group of reusable objects are identical and have same arrangement positions, the new object raster being object data in a rasterized form of a new reusable object generated by merging the reusable objects constituting the group of reusable objects, the pre-processing section also generating new layout information by replacing description of each of the reusable objects constituting the group of reusable objects in the layout information with description of a new reusable object corresponding to the group of reusable objects; and
    an assembling section that assembles the object raster generated in the rasterizing section and the new object raster generated in the pre-processing section by each page, based on the new layout information generated in the preprocessing section, thereby generating a page raster representing a rasterized image by each page.

2. The image data processor according to claim 1, wherein the preprocessing section generates a new object raster having a same size as the page, and at the same time generates new layout information of which description has been replaced with description of a new reusable object having a same size as the page.

3. The image data processor according to claim 1, further comprising an output control section that outputs a page raster generated in the assembling section to a printer that prints a visual image based on the page raster.

4. The image data processor according to claim 2, further comprising an output control section that outputs a page raster generated in the assembling section to a printer that prints a visual image based on the page raster.

5. An image data processing program non-transitory storage medium storing an image data processing program, which is executed in an information processing apparatus and causes the information processing apparatus to operate as an image data processor, the image data processor comprising:
    a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having information of arrangement positions by each page of the image objects specified by the page description data;
    a rasterizing section that receives the object data generated in the data analyzing section and rasterizes each image object in the object data, thereby generates an object raster that is object data in a rasterized form of each image object;
    a pre-processing section that generates, based on the layout information generated in the data analyzing section, in regard to a group of reusable objects appearing in a range from a lowermost layer to a layer immediately before a variable object appears in the order of arranging image objects, one new object raster for each group of pages on which reusable objects constituting the group of reusable objects are identical and have same arrangement positions, the new object raster being object data in a rasterized form of a new reusable object generated by merging the reusable objects constituting the group of reusable objects, the pre-processing section also generating new layout information by replacing description of each of the reusable objects constituting the group of reusable objects in the layout information with description of a new reusable object corresponding to the group of reusable objects; and
    an assembling section that assembles the object raster generated in the rasterizing section and the new object raster generated in the pre-processing section by each page, based on the new layout information generated in the pre-processing section, thereby generating a page raster representing a rasterized image by each page.

6. The image data processing program non-transitory storage medium according to claim 5, wherein the pre-processing section generates a new object raster having a same size as the page, and at the same time generates new layout information of which description has been replaced with description of a new reusable object having a same size as the page.

7. The image data processing program non-transitory storage medium according to claim 5, wherein the image data processor further comprises an output control section that outputs a page raster generated in the assembling section to a printer that prints a visual image based on the page raster.

8. The image data processing program non-transitory storage medium according to claim 6, wherein the image data processor further comprises an output control section that outputs a page raster generated in the assembling section to a printer that prints a visual image based on the page raster.

* * * * *